United States Patent
Oppelland et al.

(10) Patent No.: US 9,460,628 B2
(45) Date of Patent: Oct. 4, 2016

(54) METHOD AND DEVICE FOR PREVENTING UNINTENTIONAL ACCELERATION OF A MOTOR VEHICLE

(71) Applicants: Robert Bosch GmbH, Stuttgart (DE); BMW AG, Munich (DE)

(72) Inventors: Magnus Oppelland, Stuttgart (DE); Matthias Schueler, Steinheim (DE); Juergen Binder, Munich (DE); Florian Oesterreicher, Munich (DE); Dalibor Kovac, Vienna (AT)

(73) Assignees: ROBERT BOSCH GMBH, Stuttgart (DE); BMW AG, Munich (DE)

( * ) Notice: Subject to any disclaimer, the term of this patent is extended or adjusted under 35 U.S.C. 154(b) by 0 days.

(21) Appl. No.: 14/336,833

(22) Filed: Jul. 21, 2014

(65) Prior Publication Data

US 2015/0025765 A1    Jan. 22, 2015

(30) Foreign Application Priority Data

Jul. 22, 2013    (DE) .......................... 10 2013 107 781

(51) Int. Cl.

| | | |
|---|---|---|
| *G06F 7/70* | (2006.01) | |
| *G08G 1/16* | (2006.01) | |
| *G08G 1/052* | (2006.01) | |
| *B60W 50/04* | (2006.01) | |
| *B60K 28/10* | (2006.01) | |
| *B60W 30/18* | (2012.01) | |

(52) U.S. Cl.
CPC ............... *G08G 1/166* (2013.01); *B60K 28/10* (2013.01); *B60W 30/18054* (2013.01); *B60W 50/045* (2013.01); *G08G 1/052* (2013.01); *B60W 2510/0604* (2013.01); *B60W 2510/0652* (2013.01); *B60W 2510/0657* (2013.01); *B60W 2520/04* (2013.01); *B60W 2520/10* (2013.01); *B60W 2540/10* (2013.01); *B60W 2540/12* (2013.01)

(58) Field of Classification Search
CPC ...... G08G 1/66; G08G 1/052; B60T 8/1755; B60T 8/172; B60T 7/22; B60W 10/18; B60W 10/184
USPC .............. 701/70, 51; 180/275; 477/275, 169
See application file for complete search history.

(56) References Cited

U.S. PATENT DOCUMENTS

| | | | | |
|---|---|---|---|---|
| 4,530,056 A | * | 7/1985 | MacKinnon ......... | G05D 1/0238 180/168 |
| 6,102,831 A | * | 8/2000 | Wakahara ............. | B60W 10/02 477/169 |
| 6,286,617 B1 | * | 9/2001 | DeLuca .................. | B60T 7/042 180/275 |
| 2001/0047235 A1 | * | 11/2001 | Mardberg ............. | B60W 30/18 701/70 |
| 2001/0056544 A1 | * | 12/2001 | Walker .................... | B60R 25/02 726/2 |
| 2002/0020575 A1 | * | 2/2002 | DeLuca .................. | B60T 7/042 180/275 |
| 2002/0105423 A1 | * | 8/2002 | Rast ....................... | G08G 1/162 340/479 |
| 2003/0025597 A1 | * | 2/2003 | Schofield ............... | B60Q 1/346 340/435 |
| 2005/0234624 A1 | * | 10/2005 | Matsushima ....... | F16H 57/0006 701/51 |

* cited by examiner

*Primary Examiner* — Shardul Patel
(74) *Attorney, Agent, or Firm* — Norton Rose Fulbright US LLP

(57) ABSTRACT

A method for monitoring a motor vehicle includes: monitoring whether a speed of the motor vehicle indicates a stopping condition of the motor vehicle; detecting whether at least one vehicle operating condition indicating an imminent unintentional acceleration of the vehicle exists; and triggering a fault response if (i) the vehicle is in the stopping condition and (ii) the at least one vehicle operating condition indicating an imminent unintentional acceleration of the vehicle exists.

10 Claims, 1 Drawing Sheet

METHOD AND DEVICE FOR PREVENTING UNINTENTIONAL ACCELERATION OF A MOTOR VEHICLE

BACKGROUND OF THE INVENTION

1. Field of the Invention

The present invention relates to a method for monitoring an engine system for a motor vehicle such that unintentional accelerations of the motor vehicle are prevented.

2. Description of the Related Art

The operation of engine systems in motor vehicles is a safety-critical function, which is why measures for monitoring for proper functioning are serially provided. In monitoring, it is customary in particular to use three-level concepts, in which control unit functions are monitored by a torque-based or acceleration-based monitoring function. This should prevent unintentional accelerations of a motor vehicle, such as that which might occur due to a software or hardware bug in the engine control unit, for example.

Monitoring generally triggers a fault response when the ascertained engine torque or the ascertained acceleration of the vehicle is implausible and/or a predefined maximum allowed value of the monitored variable is exceeded. These methods permit a sufficiently rapid response to faults occurring in the normal driving condition.

For tolerance reasons, previous methods for detecting unintentional accelerations have used threshold values and detection times, which are suitable for driving conditions at higher speeds but do not ensure a sufficiently rapid response in the event of a fault in the speed range approaching a standstill. In particular, monitoring methods today take too much time to prevent an approach to a pedestrian who is crossing the road directly in front of the motor vehicle, for example.

BRIEF SUMMARY OF THE INVENTION

According to a first aspect of the present invention, a method for monitoring an engine system of a motor vehicle is provided, so that according to a stopping condition monitoring method, a fault response is triggered when the motor vehicle is in a stopping condition and at least one monitoring-relevant condition, which is indicative of an imminent unintentional acceleration, is met.

The above-mentioned method permits a rapid fault response for the specific case of unintentional or faulty acceleration, which occurs suddenly from a standstill or from the speed range approaching a standstill, such as that which may occur when approaching a traffic light or a crosswalk, for example, to avoid endangering pedestrians in front of the vehicle. In addition, this ensures that the above-mentioned monitoring method does not have any unintentional effects on the dynamics during normal driving operation.

Additional monitoring criteria are therefore used when the vehicle is in a stopping condition, i.e., has come to a stop or is moving only at a very low speed, the additional monitoring criteria differing from the torque-based or acceleration-based monitoring.

It may be provided that a determination is made that the stopping condition is assumed when the speed of the motor vehicle is below a predefined speed threshold value.

In addition, the stopping condition may be determined when a torque demand is present which is lower than a predefined torque demand threshold value.

The stopping condition may thus be detected in particular when the speed is below a predefined speed threshold value and there has been little or no torque demand by the driver or the driver has actuated the brake pedal. When the stopping condition of the motor vehicle is detected, the presence of another monitoring criterion is checked. If this criterion is met, an unintentional acceleration of the motor vehicle is detected and a fault response is triggered.

Furthermore, in addition to the stopping condition monitoring method, a torque-based or acceleration-based monitoring method may be carried out to monitor for an unintentional acceleration under driving conditions different from the stopping condition.

According to one specific embodiment, the stopping condition may be assumed when a braking demand exists.

Furthermore, there may be a monitoring-relevant condition when the rotational speed of a drive engine of the motor vehicle is higher than a predefined rotational speed threshold value, the drive train is not disengaged and the gradient of the rotational speed of the drive engine is greater than a predefined gradient threshold value. This is advantageous in particular with automatic transmissions having a converter clutch since a faulty engine torque, even before an unintentional vehicle acceleration, results in a definite increase in the rotational speed of the engine due to the variable transmission slip.

Alternatively or additionally, a monitoring-relevant condition may occur when the product of the rotational speed of a drive engine of a motor vehicle and a transmission ratio of a transmission in the drive train is greater than a predefined drive wheel speed threshold value and a time derivation of the product of the rotational speed of drive engine 2 and the transmission ratio exceeds a predefined gradient threshold value.

Alternatively or additionally, a monitoring-relevant condition may occur when the gradient of the speed of a drive wheel of a motor vehicle exceeds a predefined drive wheel speed gradient threshold value and the transmission ratio is not equal to zero.

Alternatively or additionally, a monitoring-relevant condition may occur when the engine torque of a drive unit, for example, an additional electric motor in a hybrid vehicle, is greater than a predefined torque threshold value and the transmission ratio is not equal to zero.

According to one further aspect, a device for monitoring an engine system of a motor vehicle is provided, the device being designed to trigger a fault response according to a stopping condition monitoring method when the motor vehicle is in a stopping condition and at least one monitoring-relevant condition is met, indicating an imminent unintentional acceleration.

According to one additional aspect, a motor vehicle is provided having an engine system and the above-mentioned device.

According to one additional aspect, a computer program is provided, which is configured to carry out all steps of the above-mentioned method.

DETAILED DESCRIPTION OF THE INVENTION

Figure 1:
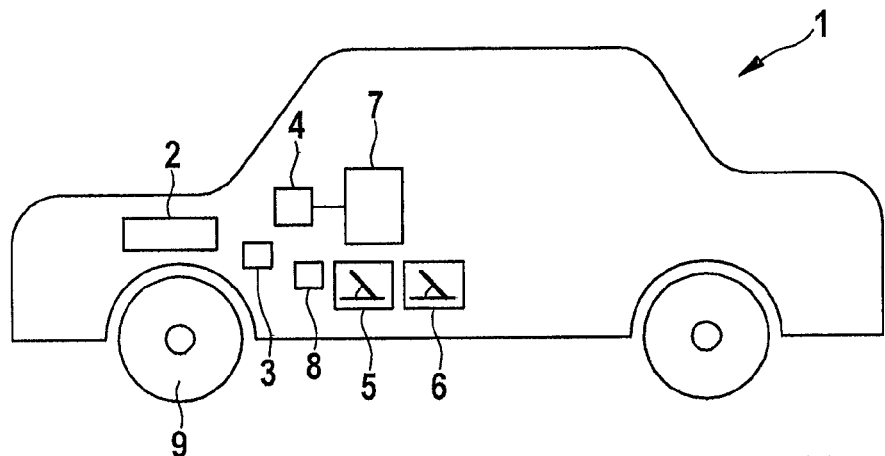
FIG. 1 shows a schematic diagram of a motor vehicle, including an engine system which includes an internal combustion engine and an engine control unit.

FIG. 1 schematically shows a motor vehicle 1, including a drive engine 2, which is designed as an internal combustion engine, for example, which is connected via a clutch 3 to a drive train (not shown). Drive engine 2 is controlled by an engine control unit 4, based in particular on a torque demand by a driver or a driver assistance system (not shown).

A torque demand may be given by the driver by actuating an accelerator pedal 5. In addition, a brake pedal 6 may be provided, so that by actuating this pedal, the driver signals his intent to carry out a braking operation or signals a demand for braking. Engine control unit 4 ascertains corresponding control variables or manipulated variables for drive engine 2, based on the torque demand in the form of a driver's intended torque, which is derived from the accelerator pedal position of accelerator pedal 5, for example. In the case of an internal combustion engine as drive engine 2, the manipulated variables may include a throttle valve manipulated variable, a fuel injector manipulated variable, a camshaft manipulated variable, a wastegate valve manipulated variable and/or the like. The manipulated variables are ascertained from the engine torque to be supplied by engine control unit 4. In the case of an electric motor as part of drive system 2, the manipulated variable may be the applied motor voltage or the motor current derived therefrom. Drive system 2 may also be designed as a hybrid drive system of an electric motor and an internal combustion engine.

A monitoring unit 7 is provided for verifying proper functioning of engine control unit 4, which monitors the control of drive engine 2 and, in the event of a fault, triggers a fault response, which brings motor vehicle 1 or the engine system of motor vehicle 1 into a safe condition. Monitoring unit 7 is frequently integrated into engine control unit 4 and is part of a three-level monitoring concept. Monitoring unit 7 has monitoring functions to carry out a traditional torque-based or acceleration-based monitoring of engine control unit 4.

However, traditional concepts for torque-based or acceleration-based monitoring do not intervene in the event of a suddenly occurring unintentional acceleration of vehicle 1 from a standstill or from a low speed, as is often the case in a driving situation when approaching a traffic light or a crosswalk. In particular, detection using the traditional monitoring methods, which have been implemented, takes too long, so that the fault response in the above-mentioned driving conditions occurs too late to prevent any threat to pedestrians who are directly in front of the motor vehicle, for example. The reasons for this include, for example, the fact that threshold values are set too high and detection times for the monitoring functions of monitoring unit 7 are too long.

Figure 2:
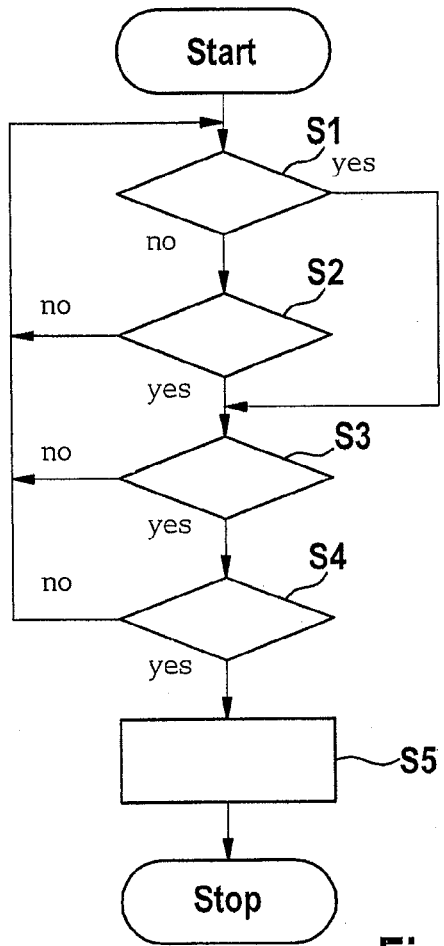
FIG. 2 shows a flow chart to illustrate a method for monitoring a motor vehicle.

FIG. 2 shows a flow chart illustrating a method for detection and implementation of a fault response in the event of an unintentional acceleration of motor vehicle 1, this method being implemented additionally in monitoring unit 7.

In step S1 it is checked whether motor vehicle 1 is in a stopping condition. The stopping condition corresponds to a condition in which vehicle 1 is at a standstill or is driving at a very low speed and there is no torque demand. This may be determined by a corresponding speed sensor 8, which is connected to a drive wheel 9 of motor vehicle 1. If the speed data obtained by engine control unit 4 from speed sensor 8 are equal to zero, the method is continued at step S10 for further fault detection.

Alternatively, if the speed data are not equal to zero, a check is carried out in step S2 as to whether the speed data indicate a speed of motor vehicle 1 lower than a predefined speed threshold value. If this is not the case (alternative: no), then the system jumps back to step S1 since no monitoring-relevant driving condition has been ascertained.

In step S3 it is checked whether a torque demand exists, for example, by checking on the accelerator pedal position of accelerator pedal 5, by verifying the information obtained from a driver assistance system or by detecting that brake pedal 6 has been actuated. It is possible to recognize, by a threshold value comparison with a predefined torque demand threshold value, whether there is only a very low torque demand by the driver or none at all.

If it is found in step S3 that there is only a negligible torque demand or none at all (alternative: yes), then the method is continued in a monitoring step S4 for checking for a monitoring-relevant fault. Otherwise (alternative no), the system jumps back to step S1.

The check in step S4 with respect to the existence of a monitoring-relevant fault may be carried out in various ways. A fault case may be ascertained in particular when one or multiple of the following conditions exist:

a) The rotational speed of drive engine 2 is higher than a predefined rotational speed threshold value, the drive train is not disengaged, i.e., clutch 3 produces at least a slipping power transmission between drive engine 2 and drive wheel 9, and the gradient of the rotational speed of drive engine 2 is greater than a predefined gradient threshold value.

b) The product of the rotational speed of drive engine 2 and the transmission ratio of a transmission 3 in the drive train is greater than a predefined drive wheel speed threshold value and the time derivation of the product of the rotational speed of drive engine 2 and the transmission ratio exceeds a predefined gradient threshold value. A time-variable quantity may also be detected and supplied here for the transmission ratio, so that a clutch slip may also be taken into account. The time derivation of the product of the rotational speed of drive engine 2 and the transmission ratio in particular may be converted into an acceleration of motor vehicle 1, which is then monitored with respect to an acceleration threshold value and in particular with regard to exceeding the acceleration threshold value.

c) The gradient of the speed of drive wheel 9 exceeds a predefined drive wheel speed gradient threshold value and the transmission ratio is not equal to zero, i.e., there is a coupling between drive engine 2 and drive wheel 9.

d) The engine torque of drive engine 2 is greater than a predefined torque threshold value, and the transmission ratio is not equal to zero. In hybrid vehicles the drive torque may correspond to the total drive torque of all drive units or only some of the drive units, depending on the hybrid concept.

If one or multiple of the above-mentioned conditions a) through d) is/are met (alternative: yes), a fault is present and a fault response is triggered. For example, in step S5, a fuel injection may be suppressed as the fault response or the function of engine control unit 4 may be deactivated. Alternatively, interventions into the power transmission are conceivable, for example, a neutral driving stage demand to a transmission control unit and/or a brake force demand to the braking system or to drive engine 2.

If drive engine 2 or one of the drive units is an electric machine, then in the fault case an active short circuit may be switched via the phase lines of the electric machine or a braking torque may be demanded [to generate a neutral torque].

If none of the above-mentioned conditions a) through d) is met (alternative: no), the method is repeated in steps S1 through S4.

What is claimed is:

1. A method for monitoring a motor vehicle, comprising: monitoring, by a speed sensor, a speed of the motor vehicle; determining, by a control unit and based on the speed of the motor vehicle indicated by output of the speed sensor, whether the speed of the motor vehicle is below a predefined speed threshold value; determining, by the control unit and based on an identified state of at least one component of the vehicle, at least one vehicle operating condition indicating an imminent acceleration of the vehicle; and triggering, by the control unit, a fault response responsive to satisfaction of both conditions that (i) the speed of the vehicle is below the predefined speed threshold value, and (ii) it is determined by the control unit that no component of the vehicle has been operated by the driver to effect the detected imminent acceleration of the vehicle; wherein the fault response is at least one of a suppression of a fuel injection, a deactivation of an engine controller of an engine, and an intervention in a power transmission.

2. The method as recited in claim 1, wherein the at least one vehicle operating condition indicating the imminent acceleration of the vehicle is detected by one of torque monitoring or acceleration monitoring of the vehicle.

3. The method as recited in claim 1, wherein the imminent acceleration of the vehicle is caused by the driver when a torque demand is higher than a predefined torque demand threshold value.

4. The method as recited in claim 1, wherein the imminent acceleration of the vehicle is caused by the driver when a braking demand is lower than a predefined braking demand threshold value.

5. The method as recited in claim 2, wherein the at least one vehicle operating condition indicates an imminent acceleration of the vehicle when (i) a rotational speed of the engine of the motor vehicle is higher than a predefined rotational speed threshold value, (ii) the drive train is engaged, and (iii) a gradient of the rotational speed of the engine is greater than a predefined gradient threshold value.

6. The method as recited in claim 2, wherein the at least one vehicle operating condition indicates an imminent acceleration of the vehicle when (i) the product of a rotational speed of the engine of the motor vehicle and a transmission ratio of a transmission in a drive train of the motor vehicle is greater than a predefined drive wheel speed threshold value, and (ii) a time derivative of the product of the rotational speed of the engine and the transmission ratio exceeds a predefined gradient threshold value.

7. The method as recited in claim 2, wherein the at least one vehicle operating condition indicates an imminent acceleration of the vehicle when (i) a gradient of the speed of a drive wheel of the motor vehicle exceeds a predefined drive wheel speed gradient threshold value, and (ii) a transmission ratio of a transmission in a drive train of the motor vehicle is not equal to zero.

8. The method as recited in claim 2, wherein the at least one vehicle operating condition indicates an imminent acceleration of the vehicle when (i) the engine torque of the engine of the motor vehicle is greater than a predefined torque threshold value, and (ii) a transmission ratio of a transmission in a drive train of the motor vehicle is not equal to zero.

9. A device for monitoring a motor vehicle, comprising: a speed sensor; and a control device, wherein: the speed sensor is configured to monitor a speed of the motor vehicle; the control device is configured to: determine, based on the speed of the motor vehicle indicated by output of the speed sensor, whether the speed of the motor vehicle is below a predefined speed threshold value; determine, based on an identified state of at least one component of the vehicle, at least one vehicle operating condition indicating an imminent acceleration of the vehicle; and trigger a fault response responsive to satisfaction of both conditions that (i) the speed of the vehicle is below the predefined speed threshold value, and (ii) it is determined by the control device that no component of the vehicle has been operated by the driver to effect the detected imminent acceleration of the vehicle; and the fault response is at least one of a suppression of a fuel injection, a deactivation of an engine controller of an engine, and an intervention in a power transmission.

10. A non-transitory computer-readable data storage medium storing a computer program which, when executed on a control device, causes the control device to perform a method for monitoring a motor vehicle, the method comprising: obtaining from a speed sensor an indication of a monitored speed of the motor vehicle; determining whether the speed of the motor vehicle is below a predefined speed threshold value; determining, based on an identified state of at least one component of the motor vehicle, at least one vehicle operating condition indicating an imminent acceleration of the vehicle; and triggering a fault response responsive to satisfaction of both conditions that (i) the speed of the vehicle is below the predefined speed threshold value, and (ii) it is determined that no component of the vehicle has been operated by the driver to effect the detected imminent acceleration of the vehicle; wherein the fault response is at least one of a suppression of a fuel injection, a deactivation of an engine controller of an engine, and an intervention in a power transmission.

* * * * *